United States Patent [19]

Ashida et al.

[11] 4,133,781

[45] Jan. 9, 1979

[54] SMOKE-RETARDANT POLYISOCYANURATE FOAM

[75] Inventors: Kaneyoshi Ashida, Hiratsuka; Masaaki Ohtani, Kawasaki; Takashi Yokoyama, Tokyo; Shoichi Ohkubo, Yokohama, all of Japan

[73] Assignee: Mitsubishi Chemical Industries Ltd., Tokyo, Japan

[21] Appl. No.: 827,258

[22] Filed: Aug. 24, 1977

[30] Foreign Application Priority Data

Sep. 6, 1976 [JP] Japan .................. 51-106532

[51] Int. Cl.$^2$ ............................................. C08J 9/00
[52] U.S. Cl. .................................. 521/154; 521/902
[58] Field of Search ............... 260/2.5 AW, 2.5 AJ

[56] References Cited

U.S. PATENT DOCUMENTS

| | | | |
|---|---|---|---|
| 3,050,477 | 8/1962 | Gmitter | 260/2.5 AH |
| 3,644,232 | 2/1972 | Bernard et al. | 260/2.5 AW |
| 3,657,305 | 4/1972 | Morehouse | 260/2.5 AJ X |
| 3,718,612 | 2/1973 | Strickman | 260/2.5 BD |
| 3,804,782 | 4/1974 | Demou et al. | 260/2.5 AW |

*Primary Examiner*—Lewis T. Jacobs
*Attorney, Agent, or Firm*—Oblon, Fisher, Spivak, McClelland & Maier

[57] ABSTRACT

A smoke-retardant polyisocyanurate foam which contains an organosilicate having hydroxypolyoxyalkylene group which is obtained by reacting a polyoxyalkyleneglycol with at least one of metallic silicon, halosilicon compounds and lower alkyl silicates.

14 Claims, 2 Drawing Figures

SMOKE-RETARDANT POLYISOCYANURATE FOAM

BACKGROUND OF THE INVENTION

1. Field of the Invention

The present invention relates to a polyisocyanurate foam having low smoke-generation, low friability and not bursting (i.e. not scattering as a powder when touched to a flame) and excellent heat-resistance and flame-retardance.

2. Description of the Prior Arts

Polyisocyanurate foams have been prepared by blending and stirring an organic polyisocyanate, and isocyanate-trimerization catalyst and a blowing agent and if necessary, a surfactant. Such foams have excellent heat-resistance and flame-retardance which are resulted by isocyanurate linkages, but have disadvantages in friability, and bursting when touched to a flame and a dense smoke-generation when initially touched to a flame.

In order to improve these disadvantages, various processes for preparing modified polyisocyanurate foams have been proposed, for example, a method of using a polyether as a modifier (U.S. Pat. No. 3,516,950); a method of using a polyester as a modifier (U.S. Pat. No. 3,931,065); a method of introducing polyoxazolidone linkage (U.S. Pat. No. 3,793,236); a method of combined use of a polyether polyol having a molecular weight of higher than 200 and a diol having a molecular weight of lower than 200 as a modifier etc.

These modified polyisocyanurate foams have improved friability and bursting property which are imparted by the modification but still have the disadvantages of decreased flame-resistance and flame-retardance and high smoke-generation. No process for preparing a polyisocyanurate foam which simultaneously possesses the four characteristics of low-smoke generation, low friability, high flame-resistance and high flame-retardance has yet been proposed.

The inventors have studied a process for preparing a polyisocyanurate foam having said four characteristics. As the results, the smoke-generation which has not been overcome could be decreased and the bursting property could be eliminated by trimerizing and foaming an organic polyisocyanate in the presence of an organosilicate such as alkoxysilane. However, the friability of the foam is relatively high to cause certain trouble in the transportation Ashida et al., U.S. Pat. No. 4,072,636.

SUMMARY OF THE INVENTION

It is an object of the present invention to provide a polyisocyanurate foam having the four characteristics of low-smoke-generation, low friability, high flame-resistance and high flame-retardance as well as no bursting property.

The foregoing and other objects of the present invention have been attained by providing a smoke-retardant polyisocyanurate foam which contains an organosilicate having hydroxypolyoxyalkylene group which is obtained by reacting a polyoxyalkyleneglycol with at least one of metallic silicon, halosilicon compounds and lower alkyl silicates.

DETAILED DESCRIPTION OF THE PREFERRED EMBODIMENTS

Figure 1:
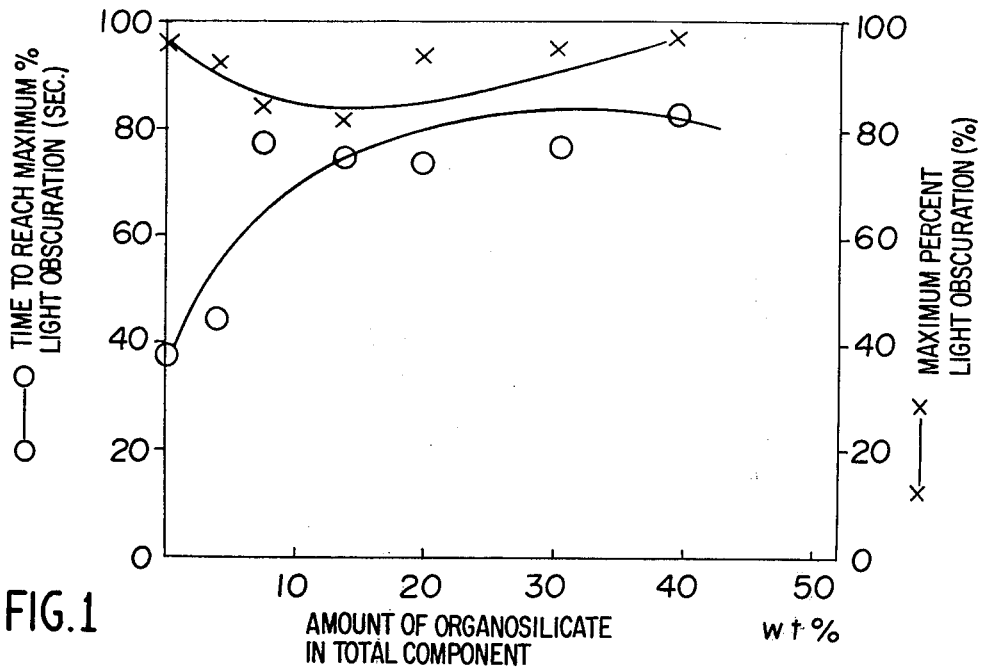
FIG. 1 shows the relationship between the amount of organosilicate prepared by reacting tetraethyl silicate with polyoxyethyleneglycol ($\overline{MW}$ = 400) in the total components of foam as a function of the smoke-generation of the polyisocyanurate foam.

The halosilicon compounds used in the present invention are the compounds having the formula $$R_n SiX_{4-n}$$

wherein R represents an organic moiety; X represents a halogen atom and n represents o or an integer of 1 to 3. Suitable organic moieties include lower alkyl groups, lower alkoxyl groups, aryl groups, glycidoxy groups and vinyl groups, preferably lower alkyl groups and lower alkoxyl groups and phenyl group.

The lower alkyl groups include methyl, ethyl, propyl and butyl groups and the lower alkoxyl groups include methoxy, ethoxy, propoxy and butoxy groups.

The halogen atoms are preferably chlorine and bromine atoms especially chlorine atom.

Suitable halosilicon compounds include silicon tetrachloride, methyl trichlorosilane, dimethyl dichlorosilane, trimethyl chlorosilane, ethyl trichlorosilane, diethyl dichlorosilane, triethyl chlorosilane, phenyl trichlorosilane, diphenyl dichlorosilane and triphenyl chlorosilane etc. It is optimum to use silicon tetrachloride as the halosilicon compounds.

The lower alkyl silicates are the compounds having the formula $$R_n Si(OR'')_{4-n}$$

wherein R represents hydrogen atom or an organic moiety; R'' represents a lower alkyl group and n represents o or an integer of 1 to 3. The lower alkyl silicates can be easily produced by reacting a lower alcohol with the silicon halide or metallic silicon. The lower alkyl groups of the lower alkyl silicates are preferably methyl, ethyl or n-butyl group.

The polyoxyalkyleneglycols are the compounds having the formula $$H{-}(OR')_m{-}OH$$

wherein R' represents a $C_2$–$C_4$ alkylene group and m represents 2 to 120.

Suitable polyoxyalkyleneglycols include polyethyleneglycols, polypropyleneglycols, polytetramethyleneglycols, oxyethyleneoxypropylene block copolymers and mixtures thereof.

It is preferable to use the polyoxyalkyleneglycols having said formula where in R' represents a $C_2$ to $C_3$ alkylene group and m represents an integer of 4 to 50, especially R' represents a $C_2$ to $C_3$ alkylene group and m represents an integer of 10 to 40, such as polyethyleneglycols having an average molecular weight of 400 to 2,000 and polypropyleneglycols having an average molecular weight of 600 to 2,000 and oxyethyleneoxypropylene block copolymers having an average molecular weight of 400 to 2,000.

The organosilicates having hydroxypolyoxyalkylene group can be produced by reacting the polyoxyalkyleneglycols with at least one of the metallic silicon, halosilicon compounds and lower alkyl silicates. The following methods can be conventionally applied for the production of the organosilicates.

(1) Dehydrogen halide method:

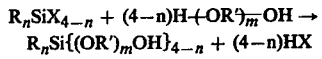

The reaction is known. The organosilicates can be produced by the conventional method as follows.

The polyoxyalkyleneglycol having the formula

is vigorously stirred and the halosilicon compound is gradually added to it at a mole ratio of (4−n) of the polyoxyalkyleneglycol to the halosilicon compound at lower than 50° C. The stirring is continued under removing the generated hydrogen halide gas. After the addition of the halosilicon compound, the mixture is gradually heated and hydrogen halide dissolved in the solution is completely purged by bubbling nitrogen gas at the temperature of higher than 150° C. and lower than the boiling point whereby the object compound is obtained.

(2) Ester interchange method:

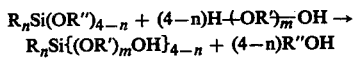

The reaction is also known. The organosilicates can be easily produced by the conventional method as described below in detail.

The lower alkyl silicate having the formula

and the polyoxyalkyleneglycol at a mole ratio of (4−n) of the polyoxyalkyleneglycol to the lower alkyl silicate are mixed at 50 to 250° C. to react them and the resulting lower alcohol at a mole ratio of (4−n) to the lower alkyl silicate is distilled off whereby the object compound is obtained.

(3) Direct Method:

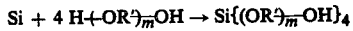

This method is disclosed in U.S. Pat. No. 3,505,379.

In the said methods, certain side-reaction such as a polymerization of silicate is caused. The organosilicate used in the invention can be used without separating the by-products caused by the side-reaction so as to impart enough smoke-retardance.

The organosilicates having hydroxypolyoxyalkylene group obtained by said method have the formula

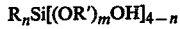

wherein R represents an organic moiety; R' represents a $C_2$ to $C_4$ alkylene group; m represents an integer of 2 to 120 and n represents o or an integer of 1 to 3.

The organic moieties include lower alkyl groups, lower alkoxy groups, aryl groups, glycidoxy groups and vinyl groups. It is preferable to use the compounds having the formula wherein R represents a lower alkyl group, a lower alkoxyl group, or phenyl group; R' represents a $C_2$ to $C_3$ alkylene group; m represents an integer of 4 to 50 and n represents o or an integer of 1 to 3.

The most preferable organosilicates are the compounds having the formula $R_nSi[(OR')_mOH]_{4-n}$ wherein R represents a $C_1$ to $C_2$ alkyl group; R' represents ethylene group; m = 10 to 40; n = 0 to 2 such as $Si[(OC_2H_4)_mOH]_4$, $CH_3Si[(OC_2H_4)_mOH]_3$, $(CH_3)_2Si[(OC_2H_4)_mOH]_2$, $C_2H_5Si[(OC_2H_4)_mOH]_3$, $(C_2H_5)_2Si[(OC_2H_4)_mOH]_2$ wherein m represents an integer of 10 to 40.

An amount of the organosilicate to the polyisocyanurate foam is 2 to 30 wt.% preferably 5 to 20 wt.% especially 7 to 15 wt.%.

FIG. 1 shows the relationship between the amount of the organosilicate prepared by reacting tetraethyl silicate with PEG 400 (polyoxyethyleneglycol, average molecular weight 400) in the total components for the foam and the smoke-generation of the polyisocyanurate foam.

The time to reach the maximum % light obscuration is prolonged and the smoke suppression effect is increased depending upon the increasing amount of the organosilicate in FIG. 1.

Figure 2:
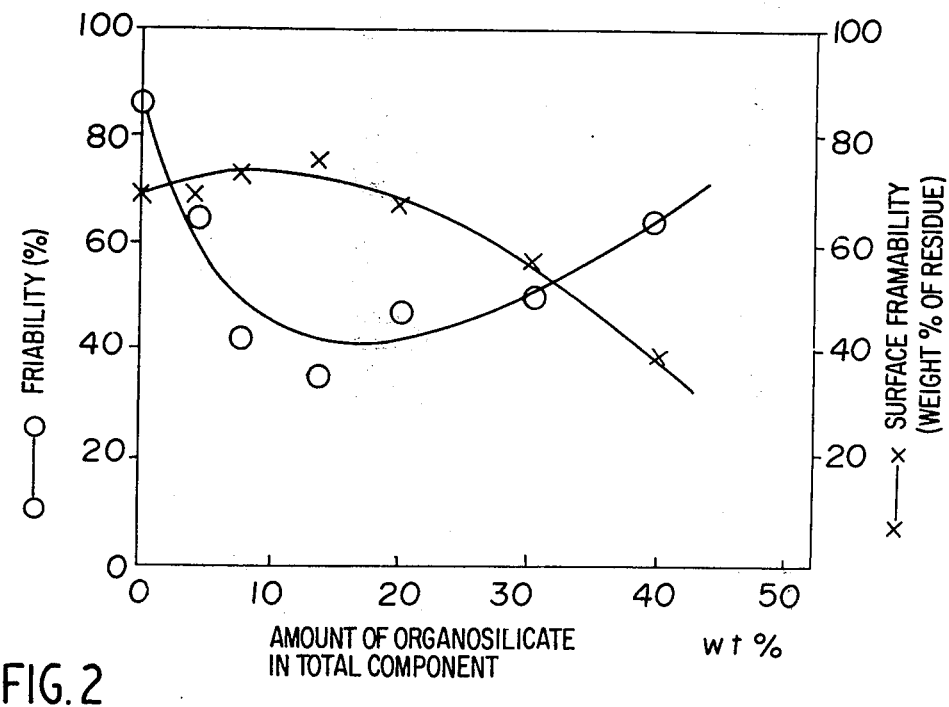
FIG. 2 shows the relationship between the amount of the same organosilicate as used in FIG. 1 in the total components of the foam and the friability and the surface flammability of the foam.

FIG. 2 shows the relationship between the amount of the same organosilicate as used in FIG. 1 in the total components of the foam and the friability and the surface flammability of the foam. A maximum in the respective relationship has been found in FIG. 2.

The amount of the organosilicate for imparting satisfactory smoke-retardancy, friability and surface flammability is preferably in a range of 5 to 20 wt.% especially 7 to 15 wt.%.

A small degree of white smoke is generated when the foam of the present invention is touched to a flame. This smoke suppression effect is unexpected in comparison with the fact that a large degree of black smoke is generated until the surface layer is carbonized when the conventional unmodified or modified polyisocyanurate foam is touched to a flame.

The organosilicate of the present invention is soluble in the ingredients for the foam and accordingly it can be soluble with one of catalysts, surfactants, polyisocyanate and modifiers or mixtures thereof so as to prepare a homogeneous solution which gives a fine and closed cell foam without a phenomenon of foam collapse.

The excellent solubility is derived from the oxyalkylene chain, especially oxyethylene chain, and a terminal hydroxyl group of the organosilicate.

However, the other organosilicates having no oxyalkylene chain and no active substituent such as tetraethoxysilane, tetrabutoxysilane, etc. have low solubility in the polyisocyanate and other foaming ingredients, therefore the solubility in the foaming step is inferior whereby the foam collapse is caused by an addition of a large amount of the other organosilicate and a satisfactory foam could not be obtained.

On the contrary, when the organosilicate of the present invention is used, the solubility in the polyisocyanate and other foaming ingredients is high to obtain the foam having excellent fine cells. The effects of the organosilicate used in the invention are (a) excellent smoke-suppression; (b) an elimination of the bursting property; (c) a surface active effect (the fine cell foams can be prepared without using such organosilicone surfactants), though it is slightly weaker in surface activity than the organolilicone surfactants for polyurethane foams; (d) a solubilizing effect (a solubility of the alkali metal salt type isocyanate-trimerization catalyst is increased thereby accelerating the trimerization) and the like. The addition of the organosiicate imparts various unexpected effects together with smoke-suppression effect.

In the process of this invention, the organic polyisocyanates are organic compounds having two or more NCO groups in one molecule and include aliphatic and aromatic polyisocyanate monomers, mixtures thereof and modified compounds thereof.

Typical aliphatic polyisocyanates include hexamethylenediisocyanate, isophoronediisocyanate, dicyclohexylmethanediisocyanate, methyl cyclohexanediisocyanate and the like. Typical aromatic polyisocyanates include tolylenediisocyanate(2,4-and/or 2,6-isomer), diphenylmethanediisocyanate, bitolylenediisocyanate, naphthylenediisocyanate (such as 1,5-naphthylenediisocyanate), triphenylmethanetriisocyanate, dianisidinediisocyanate, xylylenediisocyanate, tri(isocyanatephenyl) thiophosphate, polynuclear polyisocyanate having the formula (I)

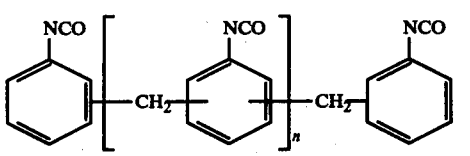
(I)

(wherein n is an integer of 0-10) (crude MDI or polymeric isocyanate) which is produced by reacting phosgene with a condensation product of aniline and formaldehyde; an undistilled tolylenediisocyanate and polyisocyanates having isocyanurate rings which are produced by reacting an organic dihalide with a metal salt of cyanic acid such as the compounds having the formula (II)

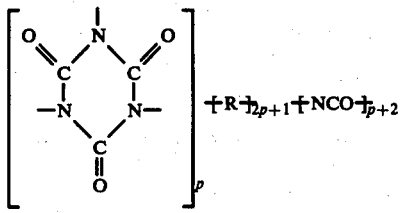
(II)

(wherein R is a divalent hydrocarbon radical and p is an integer of 1-6).

In the process of this invention, it is possible to use modified products of the polyisocyanate monomers; such as the polyisocyanates having biuret, allophanate, isocyanurate, carbodiimide, oxazolidone, amide, imide linkages, etc. which are produced by modifying said polyisocyanates.

The modified polyisocyanates also include prepolymers having terminal NCO groups produced by reacting a polyol with excess amount of polyisocyanate; such as polyisocyanates having urethane linkages which are produced by reacting trimethylolpropane with tolylenediisocyanate at a molar ratio of 1:3 or more; and prepolymers produced by reacting polyether polyol obtained by an addition of propyleneoxide to sucrose with excess amount of polymeric isocyanate under heating in the conventional process.

The organic polyisocyanates which are preferably used in the process of this invention are aromatic polyisocyanates especially the polyisocyanates having the formula (I) or (II) and modified products thereof. The optimum organic polyisocyanates are the polymeric isocyanates having the formula (I) and the modified products thereof.

The blowing agents used in the process of the invention include the conventional blowing agents used for the preparation of urethane foam and isocyanurate foam.

Suitable blowing agents include (a) inert solvents having a low boiling point such as trichloro-monofluoromethane, dichlorodifluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate such as water, hydrated compounds or water of crystallization-containing compounds, nitroalkanes, aldoximes, acid amides, enolizable compounds and the like; (c) compounds which generate gas by thermal decomposition by the heat of reaction provided in the formation of the foam such as sodium bicarbonate, ammonium bicarbonate, azobisisobutyronitrile, azoaminobenzol, dinitrosopentamethylene-tetramine and the like. The preferable blowing agents are the compounds included in the group (a) and the optimum blowing agent is trichloromonofluoromethane.

The isocyanate-trimerization catalysts used in the process of the invention include compounds which have a catalytic activity for trimerizing isocyanate groups. It is preferable to use a catalyst which has high activity for accelerating trimerization since the reaction for preparing the foam is usually initiated at room temperature and is preferably completed within a short time such as 1-5 minutes. The isocyanate-trimerization catalysts by which the polyisocyanate is solidified at 100° C. within 10 minutes are preferably used.

Typical isocyanate-trimerization catalysts include (a) tertiary amines such as triethylamine, N,N',N''-tris(-dimethylaminopropyl) hexahydrotriazine, 2,4,6-tris(-dimethylaminomethyl) phenol, tetramethyl ethylenediamine, diazabicyclo-alkane (e.g. triethylenediamine), mannich bases produced by the reaction of formaldehyde, dimethylamine and phenol or phenol having an alkyl substituent, cycloamidines and the like; (b) mixtures of a tertiary amine and a co-catalyst, such as ethanol, mono-N-substituted carbamic acid esters, water, aliphatic aldehydes, tertiary imines, benzoyl peroxide, ethylenecarbonate, α-diketones (e.g. diacetyl) and various epoxy compounds; (c) tertiary phosphines such as triethyl phosphine; (d) alkali metal salts of imides such as potassium phthalimide, sodium succinimide and the like; (e) organic onium compounds such as tetraethyl ammonium hydroxide, benzyl triethylammonium hydroxide, tetraethyl phosphonium hydroxide, trimethyl sulfonium hydroxide, (quaternary hydroxides having N.P.S. As or Sb atom) and the compound having the formula (III)

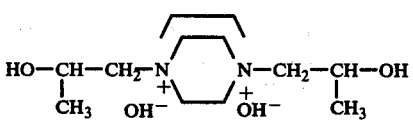
(III)

(f) ethyleneimines such as N-butyl ethyleneimine, 2-hydroxyethyl ethyleneimine and the like; (g) metal salts of carboxylic acid such as potassium acetate, potassium 2-ethylhexanoate, lead 2-ethylhexanoate, sodium benzoate, potassium naphthenate, tin octanoate and the like; (h) basic inorganic compounds such as potassium carbonate, calcium hydroxide, barium oxide, potassium hydroxide, sodium hydroxide and the like; (i) alcolates and phenolates such as sodium methoxide, potassium phenolate, sodium trichlorophenolate and the like; (j) Ti-and Sb-compounds such as tetra-butyl titanate, tri-n-butyl antimonyoxide and the like; (k) Friedel-Crafts catalysts such as zinc chloride, tin chloride, ferric chloride, antimony pentachloride, aluminum chloride, borontrifluoride and the like; (l) alkali metal complexes such as alkali metal complexes of salicylaldehyde, acetylacetone, o-hydroxyacetophenone or quinizarine; alkali metal complexes of tetra-valent boron compounds e.g. $[(R^1O)_3 BOR^2]^- M^+$ (M.-an alkali metal; $R^1$ and $R^2$: mono-valent organic group) and the like.

It is not always necessary to add a surfactant in the process of the invention and yet it is preferable to add a surfactant for forming a desirable foam structure.

The surfactants include nonionic surfactants, anionic surfactants and cationic surfactants. It is preferable to use organopolysiloxanepolyoxyalkylene block copolymers. It is also preferable to use copolymers of vinylsilane-polyoxyalkylenepolyol.

It is also possible to use the other additives if desirable. Typical additives include flame-retardants such as phosphorus or halogen-containing organic compounds, halogen-containing resins, antimony oxide, zinc oxide, aluminum hydroxide and the like; coloring agents such as pigments and dyes and inorganic fillers such as talc, diatomaceous earth, graphite, glass fiber and other inorganic fillers.

Typical processes for preparing polyisocyanurate foam can be classified as follows.

(a) Preparation of unmodified polyisocyanurate foams

An organic polyisocyanate is admixed with a trimerization catalyst, a blowing agent and a surfactant and the mixture is immediately stirred to make a foam.

(b) Preparation of modified polyisocyanurate foams

A modified polyisocyanurate foam is prepared either by blending a previously modified polyisocyanate produced by reacting a polynuclear polyisocyanate with a modifier, a trimerization catalyst, a blowing agent, and a surfactant and immediately followed by stirring the mixture (prepolymer process) or by stirring amixture composed of an unmodified polynuclear polyisocyanate, a modifier, a trimerization catalyst, a blowing agent, a surfactant, etc. at the same time (one shot process).

(c) Isocyanurate-containing polyol-based foam

A polyol having isocyanurate ring, a polyisocyanate, a blowing agent, a surfactant and an urethane-forming catalyst are blended and foamed. It is possible to select desirable one from the processes (a), (b) and (c).

In order to attain the object of the invention, it is preferable to use the process (a) reacting a polyisocyanate without a modifier in the presence of the organosilicate or the process (b) reacting a modified polyisocyanate in the presence of the organosilicate. The polyisocyanurate foam prepared by the process (c) has relatively inferior heat-resistance, flame-retardance and smoke-generation properties in comparison with that of the processes (a) or (b).

The modifiers for preparing the modified polyisocyanurate foams used in the process (b) include polyether polyols, polyester polyols, polyepoxides, polyesteramides, polyamines, polycarboxylic acids, liquid dienepolymers having terminal hydroxyl groups, oil and fats having a hydroxyl group and phenol resin prepolymers (novolak and resol).

In the modification reaction, the modifier is added at an equivalent ratio, NCO group/modifier, of more than 3 preferably 5-20.

Certain specific Examples are provided herein for purposes of illustration only and are not intended to be limiting in any manner unless otherwise specified. The evaluations of the polyisocyanurate foams were made in accordance with the following methods.

SMOKE-GENERATION

In accordance with ASTM D 2843-70 (XP-2 smoke-chamber test), a testpiece having a size of 50 mm × 50 mm × 50 mm was burnt in a box and a concentration of smoke generated in the box is shown as a % light obscuration. The maximum % light obscuration and the time to reach the maximum % light obscuration were measured. A lower maximum % light obscuration and a longer time for reaching the maximum % light obscuration indiate lower smoke-generation.

FLAME-RESISTANCE

In accordance with Bureau of Mines, Report of Investigation No. 6366 (1964), the time for required for penetrating a sharp flame through a test specimen was measured. A longer flame penetration time indicates higher flame resistance.

SURFACE FLAMMABILITY

In accordance with the Butler Chimney Test (Krueger O. A. Jr. et al., J. Cellular Plastics, Vol. 3, Page 497(1967), the surface flammability was shown by % weight retention. A higher value indicates lower flammability. A test specimen having a size of 18.75 mm × 18.75 mm × 100 mm is used. Accordingly, the data give about 10% smaller values than those of the test pieces having a normal length of 250 mm.

FRIABILITY

In accordance with ASTM C-421, friability was measured after 10 minutes operation as % weight loss. A lower value indicates lower friability.

PREPARATION OF ORGANOSILICATES (1) Ester interchange method:

In a 1 liter three necked flask equipped with a stirrer, a thermometer and a fractionating column, 208 g (1 mole) of tetraethoxysilane and 776 g (4 mole) of dehydrated tetraethyleneglycol were charged. The reaction was carried out at about 150° C. under throughly stirring to distil out about 180 g of ethanol. As the result, tetrakis (11 -hydroxy3,6,9-oxaundecanyloxy) silane was obtained in a yield of higher than 90%.

The hydroxyl value found of the product was measured by the phthalic anhydride method to give 278 (calculated: 280.5). The product was used in the following Example 2.

(2) Dehydrogen halide method

A 2 liter three necked flask equipped with a stirrer, a dropping funnel and a refluxing condenser was used. A calcium chloride tube was connected to the funnel. The other calcium chloride tube was connected to the condenser and a gas washing bottle containing an aqueous solution of sodium hydroxide was connected to the other end of the tube to absorb hydrogen chloride gas, generated.

In the flask, 800 g of dehydrated polyethyleneglycol 400 (PEG-400) (average molecular weight 400) was charged and 129.1 g (1 mole) of dimethyl dichlorosilane was added through the dropping funnel whose outlet was kept into polyethyleneglycol under vigorously stirring at lower than 50° C. After the addition, the mixture was stirred for 30 to 60 minutes and then the mixture was further stirred under gradually heating. After the reaction, the mixture was heated to 150° C. and nitrogen gas was bubbled to completely remove hydrogen chloride gas dissolved in the reaction mixture.

The end point was measured by the neutralization of the aqueous solution of sodium hydroxide (80 g of NaOH) in the bottle with the generated hydrogen chloride gas. The hydroxyl value found of the product was 132.8 (calculated: 131.1). The product was used in the following Example 11.

The organosilicates used in the following examples were obtained in accordance with methods (1) or (2). The organosilicates contained small amount of by-products having high molecular weight. In the following examples, the organosilicates were used without separating the by-products.

REFERENCE 1

A 100 g of polymeric isocyanate (Trade Name:PAPI having 133.5 of NCO equivalent; manufactured by Upjon Co.) was admixed with 20 g of trichloromonofluoromethane to prepare Solution A.

On the other hand, 2.0 g of a silicone surfactant (Trade Name: SH-193 manufactured by Toray Silicon Co., Ltd.), 1.0 g of N,N',N''-tris(dimethylaminopropyl) hexahydro-sym-triazine (hereinafter referred to as HHT), and 2.0 g of 30% diethyleneglycol solution of potassium acetate were admixed to prepare Solution B.

Solution A and the Solution B were charged in a paper cup and the mixture was vigorously stirred to make a foam. The foaming characteristics are shown in Table I. The physical properties and smoke-generation of the foam obtained are shown in Table II.

EXAMPLES 1 to 26

In accordance with the process of Reference 1 except adding the organosilicates shown in Table I at different ratios shown in Table I, the foams were prepared.

The foaming characteristics are shown in Table I. The physical properties and smoke generations of the foams are shown in Table II.

The bursting properties, friability properties and flame resistances of the foams of Examples are remarkably superior to those of Reference 1 and the smoke generations of the foams of Examples are remarkably improved.

In Table I, the following symbols are used.

EG: ethyleneglycol
DEG: diethyleneglycol
DPG: dipropyleneglycol
PEG-400: polyethyleneglycol (average molecular weight 400)
PEG-600: polyethyleneglycol (average molecular weight 600)
PPG-400: polypropyleneglycol (average molecular weight 400)
L-31: Block copolymer of ethyleneoxide and propyleneoxide (average molecular weight 1100; ethyleneoxide segment 10 wt.% manufactured by Asahi Denka K.K.)
L-44: Block copolymer of ehtyleneoxide and propyleneoxide (average molecular weight 2200: ethyleneoxide segment 40 wt.% manufactured by Asahi Denka K.K.)
C.T.: cream time
R.T.: rise time
Max. obs.(%): % maximum light obscuration
Max. obs.(sec): time to reach % maximum light obscuration

Table I
Preparation of foam

| | Organosilicate | Amount (g) | Temp. of solution (° C) | C.T. (sec.) | R.T. (sec.) |
|---|---|---|---|---|---|
| Reference 1 | none | 0 | 23 | 8 | 70 |
| Example 1 | Si(OR'OH)$_4$,[R': DEG] | 10 | 21 | 12 | 36 |
| Example 2 | Si(OR'OH)$_4$,[R': tetra EG] | 10 | 24 | 10 | 38 |
| Example 3 | " | 17.4 | 22 | 10 | 43 |
| Example 4 | Si(OR'OH)$_4$,[R': PEG-400] | 10 | 22 | 8 | 22 |
| Example 5 | " | 20 | 21 | 5 | 16 |
| Example 6 | Me$_2$Si(OR'OH)$_2$,[R': DPG] | 10 | 22 | 11 | 46 |
| Example 7 | " | 7.6 | 22 | 12 | 45 |
| Example 8 | Me$_2$Si(OR'OH)$_2$,[R': DEG] | 6.4 | 22 | 9 | 36 |
| Example 9 | Me$_2$Si(OR'OH)$_2$,[R': tetra EG] | 10 | 22 | 8 | 30 |
| Example 10 | " | 20 | 22 | 8 | 23 |
| Example 11 | Me$_2$Si(OR'OH)$_2$, [R': PEG-400] | 10 | 22 | 8 | 30 |
| Example 12 | " | 23 | 21 | 7 | 25 |
| Example 13 | MeSi(OR'OH)$_3$,[R': DEG] | 10 | 21 | 10 | 35 |
| Example 14 | MeSi(OR'OH)$_3$,[R': tetra EG] | 10 | 21 | 9 | 33 |
| Example 15 | " | 15 | 21 | 8 | 27 |
| Example 16 | MeSi(OR'OH)$_3$,[R': PEG-400] | 15 | 21 | 8 | 20 |
| Example 17 | PhSi(OR'OH)$_3$,[R': tri EG] | 10 | 21 | 14 | 45 |
| Example 18 | " | 13.7 | 21 | 10 | 35 |
| Example 19 | Me$_3$Si(OR'OH),[R': tri EG] | 10 | 21 | 8 | 30 |
| Example 20 | " | 5.3 | 21 | 12 | 42 |
| Example 21 | Si(OR'0H)$_4$,[R': PEG-600] | 12 | 23 | 7 | 28 |
| Example 22 | (EtO)$_2$Si(OROH)$_2$,[R': PEG-400] | 10 | 23 | 8 | 29 |
| Example 23 | Si(OR'OH)$_4$,[R': L-31] | 15 | 21 | 10 | 35 |
| Example 24 | Si(OR'OH)$_4$,[R': L-44] | 15 | 21 | 10 | 35 |
| Example 25 | Me$_3$SiOR'OH,[R': L-31] | 15 | 21 | 10 | 40 |
| Example 26 | Si(OR'OH)$_2$(OR''OH)$_2$,[R': PEG-400,R'': PPG-400] | 15 | 20 | 10 | 41 |

Table II

| | Organo-silicate wt.% (VS foam) | foam density (g/cm³) | friability % weight loss | Smoke-generation | | | | Surface flammability % wight retained | burn through time (min.) |
|---|---|---|---|---|---|---|---|---|---|
| | | | | 30% obs. (sec.) | 70% obs. (sec.) | Max. obs. (%) | (sec.) | | |
| Reference 1 | 0 | 0.030 | 86.7 | 5 | 12.5 | 96 | 38 | 69.5 | 45 |
| Example 1 | 7.4 | 0.030 | 43.4 | 4.1 | 10.0 | 96 | 44 | | |
| Example 2 | 7.4 | 0.027 | 61.0 | 3.5 | 9.8 | 95 | 46 | | |
| Example 3 | 12.2 | 0.033 | 57.0 | 3.6 | 7.9 | 97 | 50 | | |
| Example 4 | 7.4 | 0.032 | 43.3 | 11.5 | 47 | 85 | 78 | 73.2 | |
| Example 5 | 13.8 | 0.037 | 34.9 | 12.5 | 41.8 | 82 | 75 | 75.6 | 90 |
| Example 6 | 7.4 | 0.030 | 73.1 | 3.7 | 11.0 | 96 | 50 | | |
| Example 7 | 5.7 | 0.031 | 74.9 | 3.7 | 11.0 | 96 | 45 | | |
| Example 8 | 4.5 | 0.029 | 56.7 | 3.4 | 12.5 | 95 | 44 | | |
| Example 9 | 7.4 | 0.032 | 43.0 | 6.7 | 28 | 90 | 62 | 73.3 | |
| Example 10 | 13.8 | 0.034 | 38.7 | 13 | 45 | 84 | 77 | 73.0 | |
| Example 11 | 7.4 | 0.031 | 41.2 | 6.4 | 26 | 88 | 64 | 70.7 | 65 |
| Example 12 | 15.5 | 0.030 | 40.1 | 10 | 40 | 84 | 77 | 70.0 | |
| Example 13 | 7.4 | 0.030 | 28.0 | 5.7 | 11.8 | 95 | 42 | | |
| Example 14 | 7.4 | 0.033 | 41.1 | 6.7 | 28 | 90 | 77 | 74.2 | |
| Example 15 | 10.7 | 0.032 | 27.8 | 6.7 | 26 | 90 | 76 | 75.3 | |
| Example 16 | 10.7 | 0.032 | 41.7 | 14.3 | 54 | 81 | 90 | 78.1 | 140 |
| Example 17 | 7.4 | 0.030 | 55.0 | 6.2 | 20 | 90 | 55 | 70.3 | |
| Example 18 | 9.9 | 0.030 | 63.4 | 6.3 | 23.5 | 85 | 50 | 70.5 | |
| Example 19 | 7.4 | 0.027 | 59.2 | 4.5 | 13 | 94 | 44 | | |
| Example 20 | 4.1 | 0.029 | 64.5 | 5.7 | 13 | 92 | 43 | | |
| Example 21 | 8.8 | 0.032 | 39.2 | 17 | 57 | 78 | 84 | 76.8 | |
| Example 22 | 7.4 | 0.031 | 42.8 | 17 | 50 | 81 | 76 | 74.7 | |
| Example 23 | 10.7 | 0.038 | 20.4 | 5.3 | 29.6 | 88 | 63 | | |
| Example 24 | 10.7 | 0.037 | 32.9 | 8.6 | 48.8 | 89 | 90 | | |
| Example 25 | 10.7 | 0.038 | 24.1 | 13.2 | 51.1 | 84 | 89 | | |
| Example 26 | 10.7 | 0.037 | 35.0 | 7.5 | 43 | 85 | 72 | | |

What is claimed is:

1. A smoke-retardant polyisocyanurate foam which contains an organosilicate having hydroxypolyoxyalkylene group which is obtained by reacting a polyoxyalkyleneglycol with at least one of metalic silicon, halosilicon compounds and lower alkyl silicates wherein the amount of said organosilicate having hydroxypolyoxyalkylene group is in a range of 2 to 30 wt.% to the foam.

2. A polyisocyanurate foam according to claim 1 wherein said organosilicate having hydroxypolyoxyalkylene group is obtained by reacting a polyoxyalkyleneglycol with a halosilicon compound in a dehydrogen halide reaction.

3. A polyisocyanurate foam according to claim 1 wherein said organosilicate having hydroxypolyoxyalkylene group is obtained by an ester interchange of a lower alkyl silicate obtained by reacting a lower alcohol with metallic silicon or a halosilicon compound with a polyoxyalkyleneglycol.

4. A polyisocyanurate foam according to claim 1 wherein an amount of said organosilicate having hydroxypolyoxyalkylene group is in a range of 5 to 20 wt.% to the foam.

5. A polyisocyanurate foam according to claim 1 wherein an amount of said organosilicate having hydroxypolyoxyalkylene group is in a range of 7 to 15 wt.% to the foam.

6. A polyisocyanurate foam according to claim 1 wherein said polyoxyalkyleneglycol is a compound having the formula $$H{+}OR'{)_{\overline{m}}}OH$$

wherein R' represents a $C_2$ to $C_4$ alkylene group and m represents an integer of 2 to 120.

7. A polyisocyanurate foam according to claim 1 wherein said polyoxyalkyleneglycol is a compound having the formula $$H{+}OR'{)_{\overline{m}}}OH$$

wherein R' represents a $C_2$ to $C_3$ alkylene group and m represents an integer of 4 to 50.

8. A polyisocyanurate foam according to claim 1 wherein said polyoxyalkyleneglycol is a compound having the formula $$H{+}OR'{)_{\overline{m}}}OH$$

wherein R' represents a $C_2$ to $C_3$ alkylene group and m represents an integer of 10 to 40.

9. A polyisocyanurate foam according to claim 1 wherein said halosilicon compound is a compound having the formula $$R_nSiX_{4-n}$$

wherein R represents an organic moiety; n represents 0 or an integer of 1 to 3 and X represents halogen atom.

10. A polyisocyanurate foam according to claim 9 wherein R represents a lower alkyl group, a lower alkoxyl group or phenyl group; n represents 0 or an integer of 1 to 3 and X represents Cl or Br.

11. A polyisocyanurate foam according to claim 9 wherein said halosilicon compound is $SiCl_4$.

12. A polyisocyanurate foam according to claim 1 wherein said lower alkyl silicate is a compound having the formula $$R_nSi(OR'')_{4-n}$$

wherein R represents hydrogen atom or an organic moiety; R'' represents a lower alkyl group and n represents 0 or an integer of 1 to 3.

13. A polyisocyanurate foam according to claim 1 wherein said organosilicate having hydroxypolyoxyalkylene group is a compound having the formula $$R_nSi[(OR')_mOH]_{4-n}$$

wherein R represents a lower alkyl group, a lower alkoxyl group or phenyl group; R' represents a $C_2$ to $C_3$ alkylene group; m represents an integer of 4 to 50 and n represents 0 or an integer of 1 to 3.

14. A polyisocyanurate foam according to claim 13 wherein said organosilicate having hydroxypolyoxyalkylene group is a compound having the formula $$R_nSi[(OR')_mOH]_{4-n}$$

wherein R represents a $C_1$ to $C_3$ alkyl group; R' represents ethylene group; m represents an integer of 10 to 40 and n represents 0 or an integer of 1 to 2.